(12) United States Patent
Li

(10) Patent No.: US 11,361,655 B2
(45) Date of Patent: Jun. 14, 2022

(54) UNMANNED AERIAL VEHICLE (UAV) AND METHOD AND SYSTEM FOR HOLDING UMBRELLA USING UAV

(71) Applicants: Zhejiang Geely Holding Group Co., LTD., Hangzhou (CN); Zhejiang Geely Automobile Research Institute Co., LTD., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 358 days.

(21) Appl. No.: 16/623,391

(22) PCT Filed: Jun. 14, 2018

(86) PCT No.: PCT/CN2018/091215
§ 371 (c)(1),
(2) Date: Dec. 16, 2019

(87) PCT Pub. No.: WO2018/228461
PCT Pub. Date: Dec. 20, 2018

(65) Prior Publication Data
US 2020/0174477 A1 Jun. 4, 2020

(30) Foreign Application Priority Data
Jun. 15, 2017 (CN) .......................... 201710453692.9

(51) Int. Cl.
*G05D 1/00* (2006.01)
*G06T 7/73* (2017.01)
(Continued)

(52) U.S. Cl.
CPC .............. *G08C 17/02* (2013.01); *B60K 35/00* (2013.01); *B60R 16/0237* (2013.01);
(Continued)

(58) Field of Classification Search
CPC .... G08C 17/02; B60K 35/00; B60R 16/0237; B60R 5/04; B64C 39/024;
(Continued)

(56) References Cited

U.S. PATENT DOCUMENTS 9,798,322 B2　10/2017　Bachrach et al.
9,914,537 B2 *　3/2018　Wu ........................ B64D 47/08
(Continued)

FOREIGN PATENT DOCUMENTS

CN　103914076 A　7/2014
CN　105029854 A　11/2015
(Continued)

*Primary Examiner* — Yonel Beaulieu
(74) *Attorney, Agent, or Firm* — Cheng-Ju Chiang

(57) ABSTRACT

An unmanned aerial vehicle (UAV) configured to be carried on a vehicle and a method and a system for holding umbrella using the UAV are disclosed. The UAV and the vehicle are communicated with each other wirelessly. The UAV can be used for providing the service of holding umbrella for the occupant getting on/off the vehicle. The occupant does not have to manually hold the umbrella, so as to effectively solve the problem of getting wet when getting on/off the vehicle due to holding umbrella manually.

30 Claims, 11 Drawing Sheets

(51) Int. Cl.

| | |
|---|---|
| *G06F 3/01* | (2006.01) |
| *H04W 4/00* | (2018.01) |
| *H04W 4/40* | (2018.01) |
| *B64C 39/02* | (2006.01) |
| *G05D 1/10* | (2006.01) |
| *B60K 35/00* | (2006.01) |
| *G08C 17/02* | (2006.01) |
| *H04W 4/029* | (2018.01) |
| *B60R 16/023* | (2006.01) |

(52) U.S. Cl.
CPC ......... *B64C 39/024* (2013.01); *G05D 1/0022* (2013.01); *G05D 1/0094* (2013.01); *G05D 1/101* (2013.01); *G05D 1/106* (2019.05); *G06F 3/017* (2013.01); *G06T 7/74* (2017.01); *H04W 4/029* (2018.02); *H04W 4/40* (2018.02); *B64C 2201/108* (2013.01); *B64C 2201/128* (2013.01); *B64C 2201/14* (2013.01); *B64C 2201/208* (2013.01)

(58) Field of Classification Search
CPC ........ B64C 2201/108; B64C 2201/128; B64C 2201/14; B64C 2201/208; B64C 2201/12; G05D 1/0022; G05D 1/0094; G05D 1/101; G05D 1/106; G05D 1/10; G06F 3/017; G06T 7/74; H04W 4/029; H04W 4/40; A45B 2200/1009; A45B 11/00; A45B 19/10; A45B 2023/0037; A45B 23/00; A45B 25/143
See application file for complete search history.

(56) References Cited

U.S. PATENT DOCUMENTS

| | | | |
|---|---|---|---|
| 2015/0298654 A1* | 10/2015 | Joao | G01S 19/13 |
| | | | 701/2 |
| 2016/0364989 A1 | 12/2016 | Speasl et al. | |
| 2017/0076616 A1 | 3/2017 | Kanade et al. | |
| 2017/0244937 A1* | 8/2017 | Meier | H04N 5/23296 |
| 2018/0365676 A1* | 12/2018 | Studnicka | H04W 4/021 |
| 2019/0371176 A1* | 12/2019 | Montemurro | B60W 30/06 |
| 2020/0175252 A1* | 6/2020 | Gusikhin | H04W 4/029 |
| 2020/0349617 A1* | 11/2020 | Rosas-Maxemin | |
| | | | G06N 3/0454 |
| 2021/0089048 A1* | 3/2021 | Tran | B60R 25/257 |
| 2022/0033077 A1* | 2/2022 | Myslinski | G06Q 10/06 |

FOREIGN PATENT DOCUMENTS

| | | |
|---|---|---|
| CN | 105314110 A | 2/2016 |
| CN | 105460218 A | 4/2016 |
| CN | 105523193 A | 4/2016 |
| CN | 205706360 U | 11/2016 |
| CN | 205750548 U | 11/2016 |
| CN | 106235546 A | 12/2016 |
| CN | 106828264 A | 6/2017 |
| CN | 107415837 A | 12/2017 |
| EP | 3125064 A1 | 2/2017 |
| JP | 2004-34899 A | 2/2004 |
| JP | 2005-112321 A | 4/2005 |
| JP | 2005-280495 A | 10/2005 |
| JP | 2015-48025 A | 3/2015 |
| JP | 2016-535879 A | 11/2016 |
| JP | 2016-220137 A | 12/2016 |
| JP | 2017-56898 A | 3/2017 |
| KR | 10-2016-0121862 A | 10/2016 |
| WO | 2016/191796 A1 | 12/2016 |

* cited by examiner

UNMANNED AERIAL VEHICLE (UAV) AND METHOD AND SYSTEM FOR HOLDING UMBRELLA USING UAV

CROSS-REFERENCE TO RELATED APPLICATION

The present application is a 35 U.S.C. § 371 National Phase conversion of International Patent Application No. PCT/CN2018/091215, filed on Jun. 14, 2018, which is based on and claims the priority of Chinese patent application No. 201710453692.9, filed on Jun. 15, 2017. The entire disclosure of the above-identified applications is incorporated herein by reference. The PCT International Patent Application was filed and published in English.

TECHNICAL FIELD

The present application relates to the technical field of combined applications of vehicles with unmanned aerial vehicles (UAVs), and particularly to an unmanned aerial vehicle (UAV) configured to be carried on a vehicle, and a method and a system for holding umbrella using the UAV for persons getting on/off the vehicle on which the UAV is carried.

BACKGROUND ART

When people drive a vehicle on rainy days, using umbrellas is a big problem. Closing an umbrella when getting on the vehicle or opening an umbrella when getting off the vehicle will inevitably cause the occupants (including the driver) to wet the clothes, or to wet an interior of the door. It may cause trouble to drivers and passengers, and may damage the interior of the door and the electronic components on the door.

If an umbrella is not carried in the vehicle, the occupants can only wait for the rain to stop before getting off. If the rain keeps going down, the waiting time will be long. If the occupants are in a hurry, they can only get off in the rain, resulting in clothes getting wet.

In recent years, with the development of UAV technology, great progress has been made in flight technology and electronic control technology. However, the applications of combining UAVs with vehicles are relatively few. As UAVs are a device having a wide range of operations and having applications in many fields, UAVs can assist to realize many functions if combined with vehicles.

Technical Solution

In view of above, the present application provides an unmanned aerial vehicle (UAV) configured to be carried on a vehicle, and also provides a method and a system for holding umbrella using the UAV for persons getting on/off the vehicle on which the UAV is carried. The UAV on the vehicle can be used to provide the holding umbrella service for persons getting on/off the vehicle, solving the problem of getting wet when getting on/off the vehicle due to holding umbrella manually.

In an embodiment, the present application provides an unmanned aerial vehicle (UAV) configured to be carried on a vehicle. The UAV includes:
a UAV body;
a UAV controller;
a first driving device connected with the UAV controller;
a propeller connected with the first driving device;
a second driving device connected with the UAV controller;
an umbrella unit connected with the second driving device;
a wireless communication module connected with the UAV controller and used for wirelessly communicating with the vehicle;
wherein when the UAV provides the holding umbrella service for an occupant, the UAV controller controls the first driving device to drive the propeller to bring the UAV body to take off from the vehicle and fly above a corresponding door of the vehicle or above the occupant, the UAV controller controls the second driving device to drive the umbrella unit to be opened from a closing state to an opening state, so that the UAV holds the umbrella unit for the occupant; and
wherein after the UAV finishes the holding umbrella service for the occupant, the UAV controller controls the second driving device to drive the umbrella unit to be closed from the opening state to the closing state, the UAV controller controls the first driving device to drive the propeller to bring the UAV body to return back to the vehicle.

In an embodiment, the present application provides a system for holding umbrella for an occupant. The system includes a vehicle and an unmanned aerial vehicle (UAV) carried on the vehicle, wherein:
the UAV includes:
a UAV body;
a UAV controller;
a first driving device connected with the UAV controller;
a propeller connected with the first driving device;
a second driving device connected with the UAV controller;
an umbrella unit connected with the second driving device;
a first wireless communication module connected with the UAV controller;
the vehicle includes:
an accommodating space for carrying the UAV;
a vehicle controller;
a third driving device connected with the vehicle controller;
a cabin door connected with the third driving device, the cabin door provided above the accommodating space;
a second wireless communication module connected with the vehicle controller, the UAV and the vehicle communicated with each other wirelessly via the first wireless communication module and the second wireless communication module;
wherein when the UAV provides the holding umbrella service for an occupant, the vehicle controller controls the third driving device to drive the cabin door to open, the UAV controller controls the first driving device to drive the propeller to bring the UAV body to take off from the accommodating space fly above a corresponding door of the vehicle or above the occupant, the UAV controller controls the second driving device to drive the umbrella unit to be opened from a closing state to an opening state, so that the UAV holds the umbrella unit for the occupant; and
wherein after the UAV finishes the holding umbrella service for the occupant, the UAV controller controls the second driving device to drive the umbrella unit to be closed from the opening state to the closing state, the UAV controller controls the first driving device to drive the propeller to bring the UAV body to return back to the accommodating space, the vehicle controller controls the third driving device to drive the cabin door to close.

In an embodiment, the present application provides a method for holding umbrella for an occupant getting off a vehicle, wherein the method includes:

the vehicle controller controlling the third driving device to drive the cabin door to open;

the UAV controller controlling the first driving device to drive the propeller to bring the UAV body to take off from the accommodating space and fly above the door from which the occupant is going to get off the vehicle;

the UAV controller controlling the second driving device to drive the umbrella unit to be opened from a closing state to an opening state, so that the UAV holds the umbrella unit for the occupant;

after the occupant getting off the vehicle, the UAV controller controlling the first driving device to bring the UAV body to fly and track the occupant automatically until the occupant reaches his/her destination;

the UAV controller controlling the second driving device to drive the umbrella unit to be closed from the opening state to the closing state;

the UAV controller controlling the first driving device to drive the propeller to bring the UAV body to return back to the accommodating space; and the vehicle controller controlling the third driving device to drive the cabin door to close.

In an embodiment, the present application provides a method for holding umbrella for an occupant getting on a vehicle, wherein the method includes:

the electronic terminal receiving a call instruction of calling the UAV inputted by an occupant;

the electronic terminal sending the call instruction to the vehicle and the UAV, the electronic terminal sending the position information of the electronic terminal to the UAV;

the vehicle controller controlling the third driving device to drive the cabin door to open;

the UAV controller controlling the first driving device to drive the propeller to bring the UAV body to take off from the accommodating space and fly above the location where the occupant is located according to the position information of the electronic terminal;

the UAV controller controlling the second driving device to drive the umbrella unit to be opened from a closing state to an opening state, so that the UAV holds the umbrella unit for the occupant;

the UAV controller controlling the first driving device to bring the UAV body to fly and track the occupant automatically until the occupant gets on the vehicle;

after the occupant getting on the vehicle, the UAV controller controlling the second driving device to drive the umbrella unit to be closed from the opening state to the closing state;

the UAV controller controlling the first driving device to drive the propeller to bring the UAV body to return back to the accommodating space; and the vehicle controller controlling the third driving device to drive the cabin door to close.

Advantageous Effects

According to the embodiments, the present application provides an unmanned aerial vehicle (UAV) configured to be carried on a vehicle, and also provides a method and a system for holding umbrella using the UAV for persons getting on/off the vehicle. The UAV on the vehicle can be used to provide the holding umbrella service for persons getting on/off the vehicle. Since the occupant does not have to manually hold the umbrella, it is convenient for the occupant to get on/off the vehicle, thereby effectively solving the problem of getting wet when getting on/off the vehicle due to holding umbrella manually.

DESCRIPTION OF DRAWINGS

FIG. 4b is a schematic top view of the vehicle of FIG. 4a.

FIG. 5b is a schematic top view of the vehicle of FIG. 5a.

FIG. 6b is a schematic top view of the vehicle of FIG. 6a.

MODE FOR INVENTION

In order to make the purposes, characteristics, and advantages of the present application more apparently, embodiments of the present application will now be described in more detail with reference to the accompanying drawings.

Figure 1:
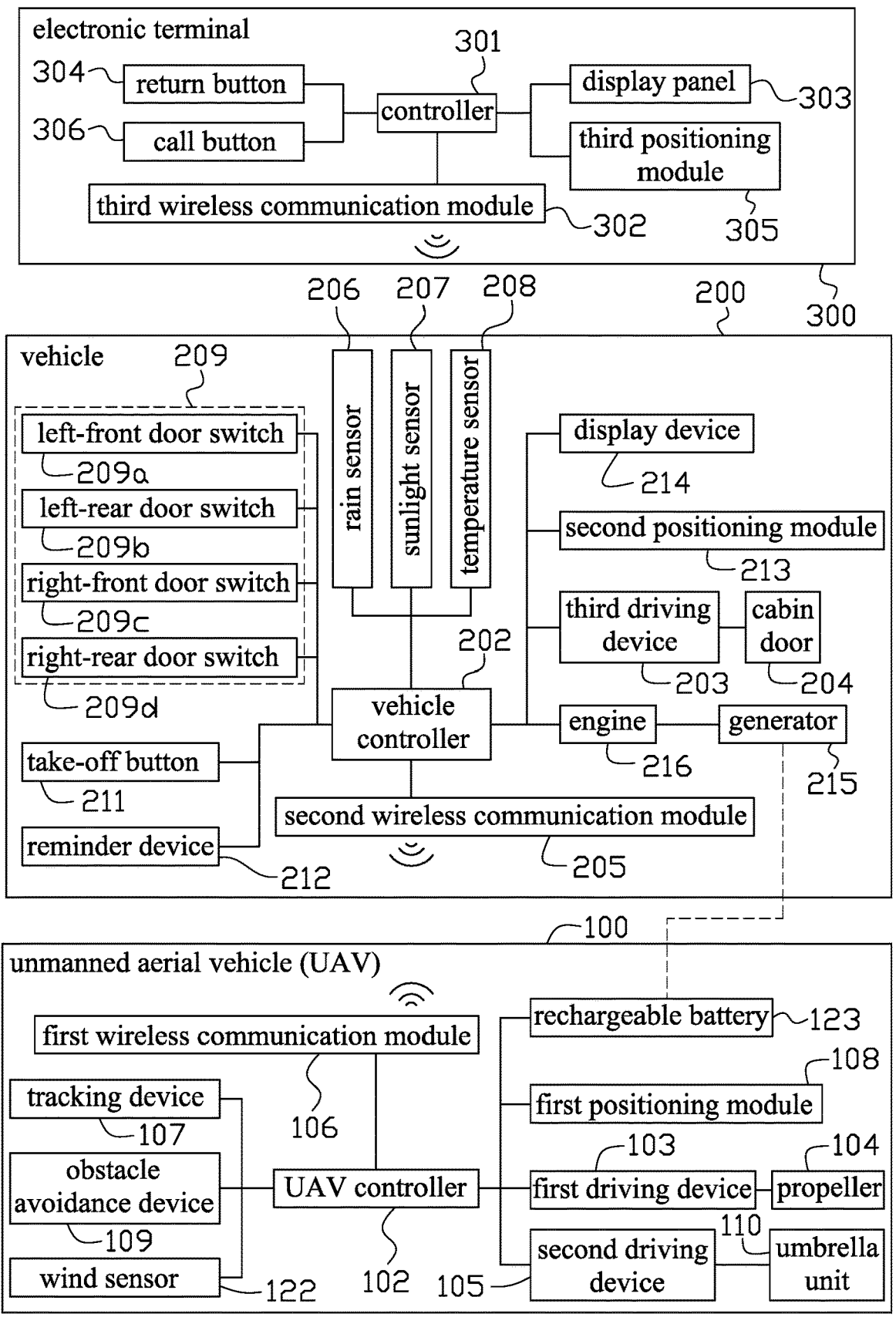
FIG. 1 is a block diagram of a system for holding umbrella using an unmanned aerial vehicle (UAV) according to an embodiment of the present application.
Figure 2:
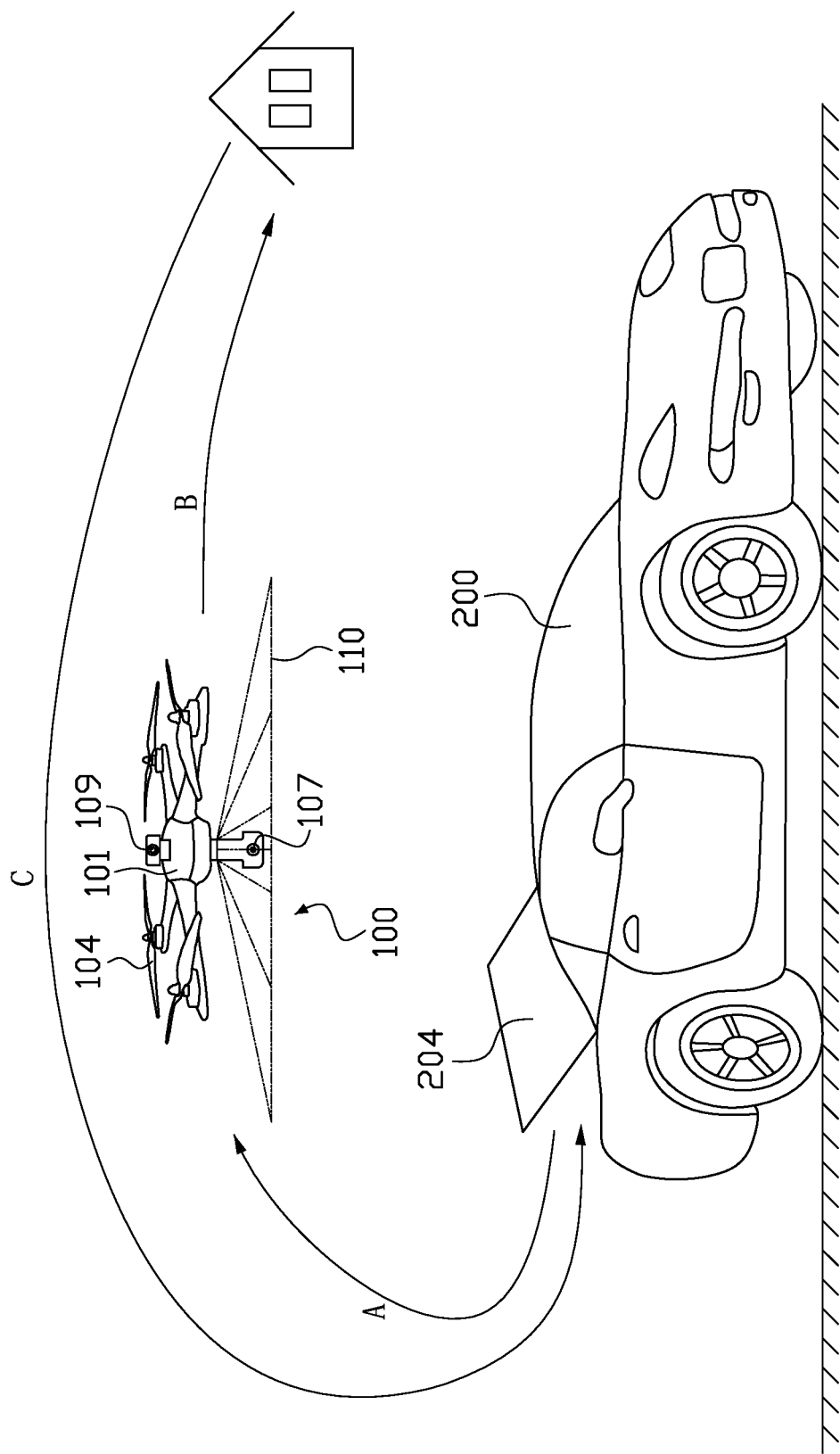
FIG. 2 is a schematic view showing that a UAV is used for holding umbrella for persons getting off a vehicle according to an embodiment of the present application.

Referring to FIG. 1 and FIG. 2, a system for holding umbrella is provided in an embodiment of the present application. The system includes a vehicle 200 and an unmanned aerial vehicle (UAV) 100 configured to be carried on the vehicle 200.

The UAV 100 includes a UAV body 101, a UAV controller 102, a first driving device 103, a propeller 104, a second driving device 105, an umbrella unit 110, and a first wireless communication module 106. The first driving device 103 is connected with the UAV controller 102. The propeller 104 is connected with the first driving device 103. The second driving device 105 is connected with the UAV controller 102. The umbrella unit 110 is connected with the second driving device 105. The first wireless communication module 106 is connected with the UAV controller 102.

The vehicle 200 includes an accommodating space 201, a cabin door 204, a vehicle controller 202, a third driving device 203, and a second wireless communication module 205. The accommodating space 201 is used for carrying the UAV 100. The cabin door 204 is provided above the accommodating space 201 and used for hermetically covering the accommodating space 201. The third driving device 203 is connected with the vehicle controller 202. The cabin door 204 is connected with the third driving device 203. The second wireless communication module 205 is connected with the vehicle controller 202. The UAV 100 and the vehicle 200 are communicated with each other wirelessly via the first wireless communication module 106 and the second wireless communication module 205.

Ordinarily, the UAV 100 is docked to the vehicle 200 in the accommodating space 201, and the cabin door 204 covers hermetically on the accommodating space 201 to prevent the UAV 100 from exposure to the outside, which is beneficial to damage prevention, anti-theft and dustproof of the UAV 100. As the UAV 100 is equipped with an umbrella unit 110 which can be opened and closed, the UAV 100 can be used for providing the holding umbrella service for the occupants (includes the driver) getting on/off the vehicle 200.

When the UAV 100 provides the holding umbrella service for an occupant, the vehicle controller 202 controls the third drive device 203 to drive the cabin door 204 to open, the UAV controller 102 controls the first drive device 103 to drive the propeller 104 to bring the UAV body 101 to take off from the accommodating space 201 and fly above a corresponding door of the vehicle 200 or above the occupant, and the UAV controller 102 controls the second drive device 105 to drive the umbrella unit 110 to be opened from a closing state to an opening state, so that the UAV 100 holds the umbrella unit 110 for the occupant. After the UAV 100 finishes the holding umbrella service for the occupant, the UAV controller 102 controls the second drive device 105 to drive the umbrella unit 110 to be closed from the opening state to the closing state, the UAV controller 102 controls the first drive device 103 to drive the propeller 104 to bring the UAV body 101 to return back to the accommodating space 201, and the vehicle controller 202 controls the third drive device 203 to drive the cabin door 204 to close.

Referring to FIG. 2, details are given by taking the example of the UAV 100 to provide the holding umbrella service for the occupant getting off the vehicle 200.

When the UAV 100 provides the holding umbrella service for the occupant getting off the vehicle 200, firstly, the vehicle controller 202 controls the third driving device 203 to drive the cabin door 204 to open.

Thereafter, the UAV controller 102 controls the first driving device 103 to drive the propeller 104 to bring the UAV body 101 to take off from the accommodating space 201 and fly above the door from which the occupant is going to get off the vehicle 200 (as shown by route A).

The UAV controller 102 controls the second driving device 105 to drive the umbrella unit 110 to be opened from a closing state to an opening state, so that the UAV 100 holds the umbrella unit 110 for the occupant. Specifically, after the UAV body 101 takes off from the accommodating space 201, the umbrella unit 110 is driven to be opened to the opening state from the closing state. Optionally, the umbrella unit 110 is driven to be opened to the opening state from the closing state until the UAV body 101 flies for hovering above the door from which the occupant is going to get off. In the embodiment, the opened umbrella unit 110 provides umbrella service for the occupant getting off the vehicle 200, to prevent the occupant from getting wet in the course of getting off and also prevent an interior of the door from getting wet.

Further, after the occupant gets off the vehicle 200, the UAV controller 102 controls the first driving device 103 to drive the UAV body 101 to fly and track the occupant automatically until the occupant reaches his/her destination, e.g., office, home, or any other destinations (as shown by route B).

After the UAV 100 finishes the holding umbrella service for the occupant, the UAV controller 102 controls the second driving device 105 to drive the umbrella unit 110 to be closed from the opening state to the closing state.

Thereafter, the UAV controller 102 controls the first driving device 103 to drive the propeller 104 to bring the UAV body 101 to return back to the accommodating space 201 of the vehicle 200 (as shown by route C).

After the UAV body 101 is docked to the vehicle 200 in the accommodating space 201, the vehicle controller 202 controls the third driving device 203 to drive the cabin door 204 to close.

In the embodiment, when the UAV 100 provides holding umbrella service for the occupant, it is not limited to the course of opening door and getting off, but also after the occupant gets off, the UAV 100 flies and tracks the occupant automatically until the occupant arrives at his/her destination, to realize escorting of holding umbrella all the way from the course of getting off the vehicle 200 until the destination of the occupant.

Preferably, as the UAV body 101 flies to automatically track the occupant, the potential obstacles in a surrounding environment of the UAV body 101 are further detected, the UAV controller 102 controls the first driving device 103 to drive the UAV body 101 to keep away from the obstacles based on the detected result, in order to prevent the UAV body 101 or the umbrella unit 110 from colliding with the potential obstacles in the course of escorting the occupant by holding umbrella, thereby improving the security of flight.

Referring to FIG. 1, the vehicle 200 further includes a rain sensor 206 connected with the vehicle controller 202. The rain sensor 206 is used for detecting the raining information in the external environment, and the vehicle controller 202 determines whether the UAV 100 is required to provide holding umbrella service or not according to the detecting result of the rain sensor 206. For example, if the rainfall detected by the rain sensor 206 in the external environment is greater than a preset value, the vehicle controller 202 determines that the UAV 100 is required to provide holding umbrella service for the occupant.

The holding umbrella service for the occupant is not limited to raining days, in the high temperature summer under the sun, it may also use the UAV 100 to provide holding umbrella service for the occupant. Therefore, the vehicle 200 may further include a sunlight sensor 207 and a temperature sensor 208 both of which are connected with the vehicle controller 202. The sunlight sensor 207 is used for detecting the sunlight information in the external environment, the temperature sensor 208 is used for detecting the temperature information in the external environment, and the vehicle controller 202 determines whether the UAV 100 is required to provide holding umbrella service or not according to the detecting results of the sunlight sensor 207 and the temperature sensor 208. For example, if the sunlight detected by the sunlight sensor 207 in the external environment is greater than a preset value and the temperature detected by the temperature sensor 208 in the external environment is also greater than a preset value, the vehicle controller 202 determines that the UAV 100 is required to provide holding umbrella service for the occupant.

Specifically, the above rain sensor 206 and the above sunlight sensor 207 may be integrated into a single, that is, a single sensor can be used for simultaneously detecting the raining information and the sunlight information in the external environment.

The vehicle 200 further includes a plurality of door switches 209 connected with the vehicle controller 202. Taking a vehicle having four doors as an example, the plurality of door switches 209 may include a left-front door switch 209a, a left-rear door switch 209b, a right-front door switch 209c, and a right-rear door switch 209d. The vehicle controller 202 is able to recognize the opening door which is currently being opened by the occupant according to on/off states of the plurality of the door switches 209, the vehicle 200 sends the information about the opening door which is currently being opened to the UAV 100 via the second wireless communication module 205, and the UAV 100 flies above the opening door which is currently being opened according to the received information about the opening door. For example, when the vehicle controller 202 determines that the UAV 100 is required to provide holding umbrella service according to the raining information detected by the rain sensor 206, and the occupant is seated on the left side of the rear seats and is going to getting off from the left-rear door, the occupant can firstly unlock the left-rear door (but does not open the door at this moment), the vehicle controller 202 recognizes that the opening door which is currently being opened by the occupant is the left-rear door according to the change of a state of the left-rear door (the left-rear door has changed from a locking state to an unlocking state) and sends the information about the left-rear door to the UAV 100, and the UAV 100 flies above the left-rear door according to the received information about the left-rear door, in order to provide holding umbrella service for the occupant getting off from the left-rear door of the vehicle 200.

Furthermore, the vehicle 200 further includes a take-off button 211 connected with the vehicle controller 202. The take-off button 211 is used for the driver to manually input a take-off instruction indicating a specific door that needs the umbrella service. The vehicle 200 sends the take-off instruction inputted by the take-off button 211 to the UAV 100 via the second wireless communication module 205, and the UAV 100 takes off from the vehicle 200 according to the take-off instruction and flies above the indicated specific door. That is, the driver can designate the door that needs the umbrella service of the UAV 100 via the take-off button 211, whereby the occupant only needs to wait in the vehicle 200, without the need of unlocking the door in advance. After the UAV 100 has flown above the door, the occupant then unlocks and opens the door to get off the vehicle 200.

In addition, when there are multiple occupants getting off the vehicle 200, the driver can set the order of providing umbrella service for the multiple occupants through the take-off button 211. For example, if, among the multiple occupants, there is an important person needing the umbrella service in priority, the driver can operate the take-off button 211 to specify the door from which the important person is going to get off to be given the top priority with respect to the umbrella service, so that the UAV 100 provides holding umbrella service for the important person firstly.

Further, the quantity of the UAV 100 docked to the vehicle 200 may be more than one, so that when there are multiple occupants getting off the vehicle 200, the multiple UAVs 100 can provide holding umbrella service for the multiple occupants respectively and simultaneously.

The vehicle 200 further includes a reminder device 212 connected with the vehicle controller 202. When the UAV 100 has flown above the door from which the occupant is going to get off, the UAV 100 sends a reminding signal that the occupant can get off to the vehicle 200 via the first wireless communication module 106, and the vehicle controller 202 controls the reminder device 212 to remind the occupant to get off according to the received reminding signal. Specifically, the reminder device 212 can be based on sound or light. By the reminder device 212, the occupant in the vehicle 200 can understand that the UAV 100 is ready, to clearly know when to open the door and get off.

When the UAV 100 provides holding umbrella service for the occupant getting off, it is not limited to the course of opening door and getting off, but also after the occupant gets off, the UAV 100 flies to follow the occupant automatically until the occupant arrives at his/her destination. Therefore, the UAV 100 further includes a tracking device 107 connected with the UAV controller 102. The tracking device 107 is used to track the occupant, and according to the tracking result of the tracking device 107, the UAV controller 102 controls the first driving device 103 to drive the UAV body 101 to fly and track the occupant automatically until his/her destination, so as to realize escorting of holding umbrella all the way from the course of getting off the vehicle 200 until the destination of the occupant.

The UAV 100 further includes a first positioning device 108 connected with the UAV controller 102. The first positioning module 108 is used for obtaining the current position of the UAV 100. The vehicle 200 further includes a second positioning module 213 connected with the vehicle controller 202. The second positioning module 213 is used for obtaining the current position of the vehicle 200. The position information of the vehicle 200 is sent to the UAV 100 through the second wireless communication module 205. Thus, after the UAV 100 finishes the holding umbrella service, the UAV controller 102 controls the UAV 100 to automatically return back to the accommodating space 201 according to the position information of the UAV 100 and the position information of the vehicle 200, so as to realize automatic returning of the UAV 100.

By obtaining the position information of the vehicle 200 through the second positioning module 213, even if the vehicle 200 is moved in the course of holding umbrella service, for example, the vehicle 200 is driven by the driver from the temporary drop-off point where the occupant gets off to a parking lot, the UAV 100 can still find the vehicle 200 according to the received position information of the vehicle 200, so as to realize automatic returning.

The vehicle 200 further includes a display device 214. The position information of the UAV 100 obtained by the first positioning module 108 is sent to the vehicle 200 through the first wireless communication module 106, and the vehicle 200 displays the current position of the UAV 100 on the display device 214, so that the driver can understand in real time the flight path and the current position of the UAV 100 through the display device 214 when the UAV 100 provides the holding umbrella service in the outside.

Further, the system includes an electronic terminal 300. The electronic terminal 300 can be carried by the driver. The electronic terminal 300 may be a smart phone, a tablet computer, a smart watch, a smart hand ring, etc. The electronic terminal 300 includes a controller 301 and a third wireless communication module 302. The electronic terminal 300 and the UAV 100 are communicated with each other wirelessly via the third wireless communication module 302 and the first wireless communication module 106, the electronic terminal 300 and the vehicle 200 are communicated with each other wirelessly via the third wireless communication module 302 and the second wireless communication module 205. The position information of the UAV 100 obtained by the first positioning module 108 is further sent to the electronic terminal 300 through the first wireless communication module 106, and the electronic terminal 300 displays the current position of the UAV 100 on a display panel 303 of the electronic terminal 300, so that the driver can understand in real time the flight path and the current position of the UAV 100 through the electronic terminal 300 when the UAV 100 provides the holding umbrella service in the outside.

In an embodiment, the tracking device 107 is a camera. The camera is provided below the umbrella unit 110, in order to facilitate using the camera to capture the images of the occupant to enable the UAV 100 to realize automatically tracking the occupant. Further, after the occupant is escorted by the UAV 100 to his/her destination, the occupant can give a specific gesture to the UAV 100, such as giving an OK gesture or shaking hand (similar to a good-bye gesture). The camera is further used to recognize the specific gesture given by the occupant, and the UAV controller 102 determines according to the specific gesture that the occupant has reached his/her destination and begins to control the UAV body 101 to return back.

In other embodiments, the driver can also monitor whether the UAV 100 has escorted the occupant to the destination by the electronic terminal 300. When the UAV 100 has escorted the occupant to the destination, the driver sends out a return instruction through the electronic terminal 300 to the UAV 100, and the UAV 100 begins to return upon receiving the return instruction. For example, the electronic terminal 300 further includes a return button 304 used for the user to send a return instruction to the UAV 100, the return instruction is sent to the UAV 100 through the third wireless communication module 302, and the UAV controller 102 controls the UAV body 101 to begin to return upon receiving the return instruction.

In other embodiments, the UAV 100 can also determine whether the occupant has been escorted to his/her destination by detecting a surrounding environment, to decide the time to return.

Preferably, the UAV 100 further includes an obstacle avoidance device 109 connected with the UAV controller 102. The obstacle avoidance device 109 is used for detecting the potential obstacles existed in a surrounding environment of the UAV body 101 when it flies. The UAV controller 102 controls the first driving device 103 to drive the UAV body 101 to keep away from the obstacles in flight according to the detected result of the obstacle avoidance device 109, to improve the security of flight.

In an embodiment, as shown in FIG. 2, the obstacle avoidance device 109 is a camera. The camera is provided above the umbrella unit 110, in order to facilitate capturing the potential obstacles in the surrounding environment of the UAV body 101. The quantity of the camera may be multiple. The camera determines whether there are obstacles in the surrounding environment of the UAV body 101 according to captured images.

Figure 3:
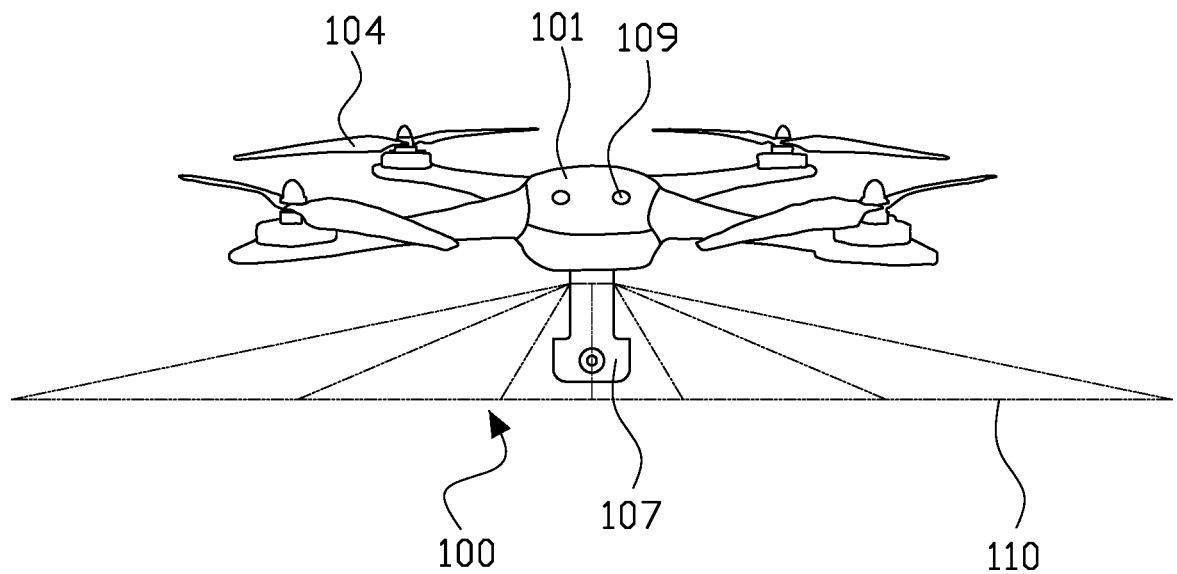
FIG. 3 is a schematic view of a UAV according to another embodiment of the present application.

In another embodiment, as shown in FIG. 3, the obstacle avoidance device 109 includes a plurality of ranging sensors. The ranging sensors are distributed over the outer surface of the UAV body 101. Specifically, the ranging sensor may be selected from infrared ranging sensor, ultrasonic ranging sensor, laser ranging sensor, and microwave radar ranging sensor. The distance measurement theory of the ranging sensor is as follows. A propagation speed of a wireless signal (e.g., infrared, ultrasonic, laser, microwave) emitted by the ranging sensor is known in the air, the time is measured when the wireless signal is reflected back after emission, the actual distance between the emitting point and the obstacle is calculated out based on the time difference between the emission and the reception of the signal.

The UAV 100 further includes a wind sensor 122 connected with the UAV controller 102. The wind sensor 122 is used for detecting the wind direction in the external environment. The UAV controller 102 can adjust the flight gesture of the UAV body 101 according to the detecting result of the wind sensor 122, to maintain the outer surface of the umbrella unit 110 to face towards the windward side. As such, the UAV 100 can achieve a better effect in holding umbrella and prevent the rain from wetting the occupant in the course of holding umbrella. Specifically, the wind sensor 122 can be a gravity sensor.

The UAV 100 further includes a rechargeable battery 123. The vehicle 200 further includes a generator 215, and the generator 215 can be driven to generate electricity by an engine 216 of the vehicle 200. When the UAV 100 is docked in the accommodating space 201, the rechargeable battery 123 is electrically connected with the generator 215, such that the generator 215 can be used to charge the rechargeable battery 123. As such, the UAV 100 can be charged in time after finishing the holding umbrella service, in order to ensure that the electric power is sufficient for preparation of the next service of holding umbrella.

Figure 4A:
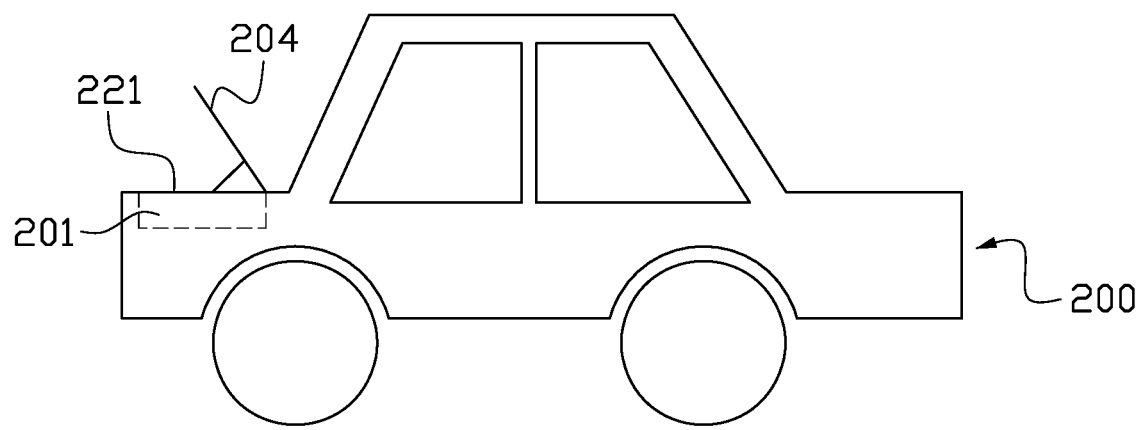
FIG. 4a is a schematic side view of a vehicle according to an embodiment of the present application.
Figure 4B:
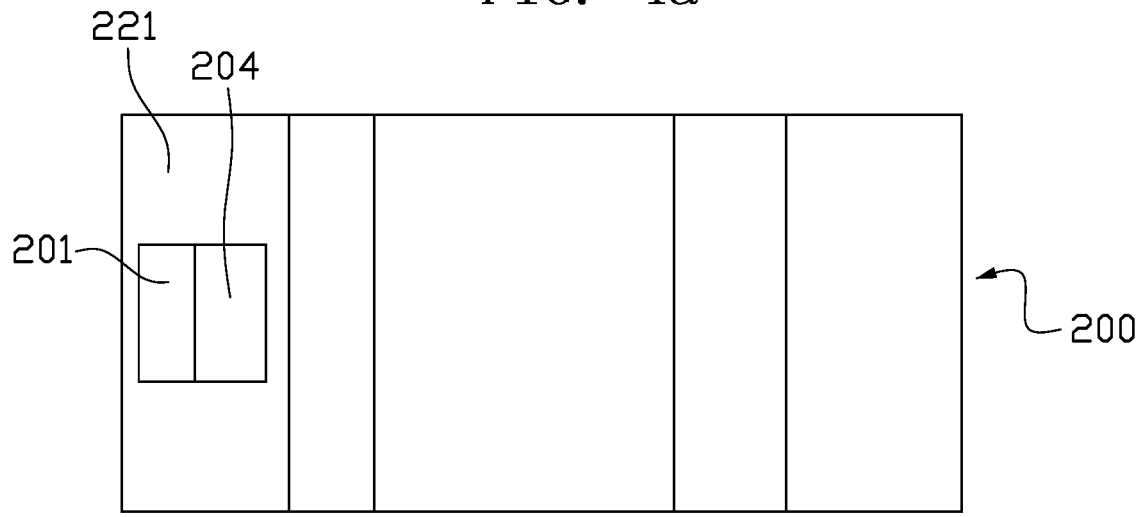

As shown in FIG. 4a and FIG. 4b, the accommodating space 201 may be formed at the trunk, and the cabin door 204 may be formed on the trunk cover 221, so that an interior space of the trunk can be used to accommodate the UAV 100.

Figure 5A:
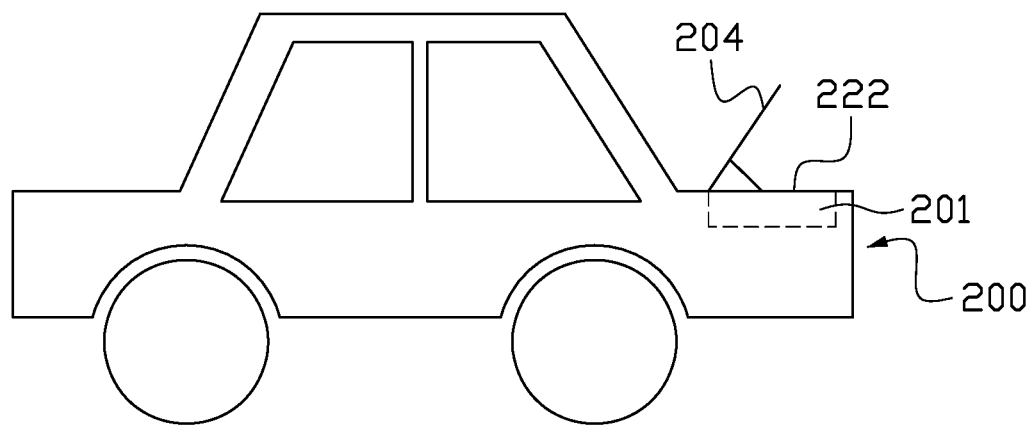
FIG. 5a is a schematic side view of a vehicle according to another embodiment of the present application.
Figure 5B:
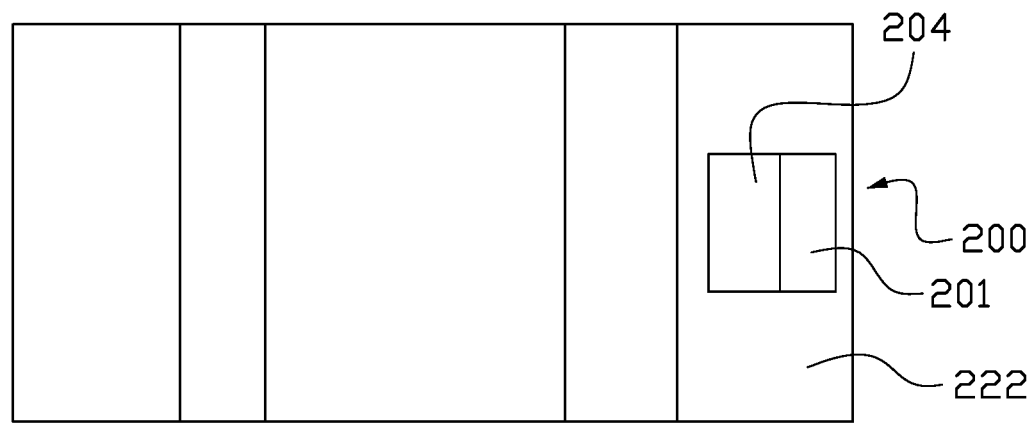

As shown in FIG. 5a and FIG. 5b, the accommodating space 201 may be formed at the engine compartment, and the cabin door 204 may be formed on an engine cover 222, so that an interior space of the engine compartment can be used to accommodate the UAV 100. Further, the engine compartment is convenient for drainage and meanwhile provides high temperature. It is easy to dry the UAV 100.

Figure 6A:
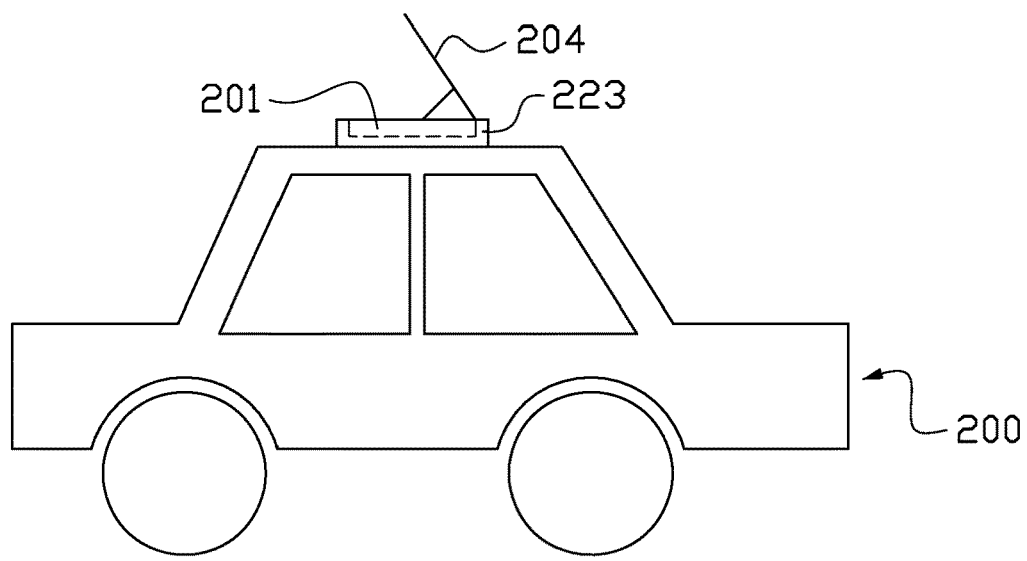
FIG. 6a is a schematic side view of a vehicle according to a further embodiment of the present application.
Figure 6B:
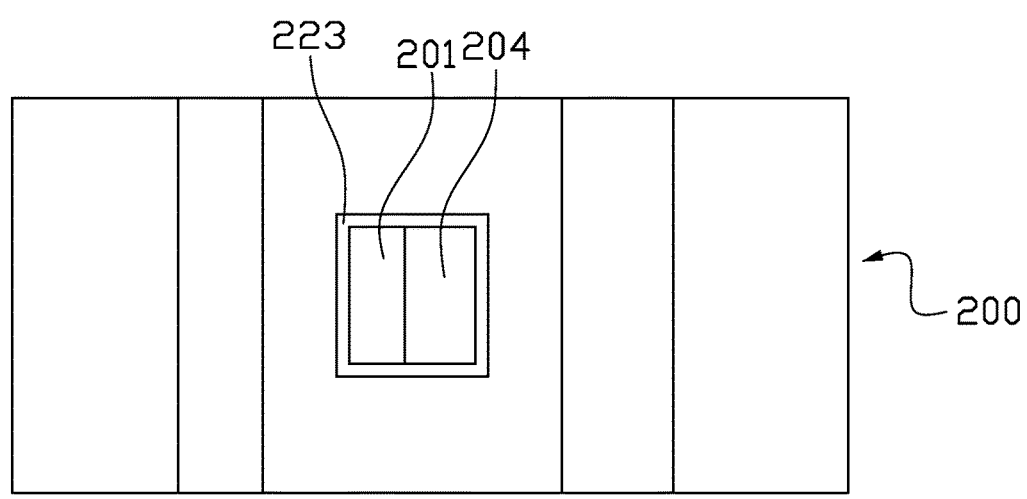

As shown in FIG. 6a and FIG. 6b, the accommodating space 201 may be formed at the roof of the vehicle 200. For example, there is provided with a case 223 on the roof for carrying the UAV 100, and the cabin door 204 may be a cover of the case 223, so that the UAV 100 does not occupy the space in the trunk and the engine compartment.

Figure 7:
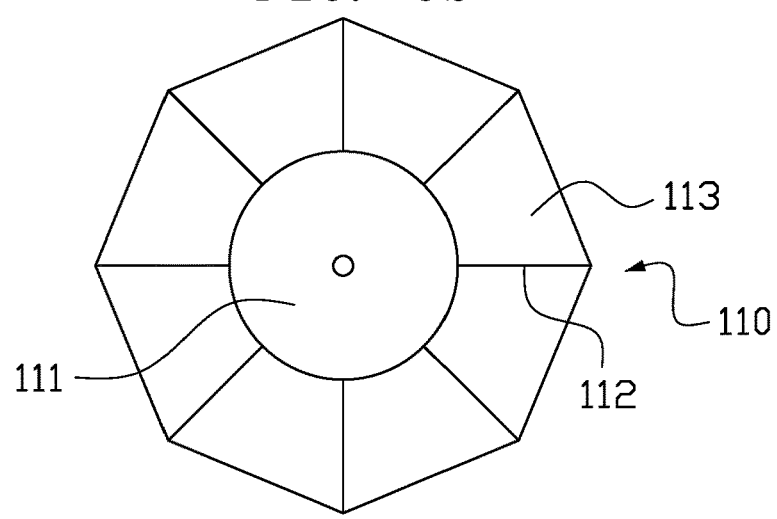
FIG. 7 is a schematic top view of an umbrella unit of a UAV in an opening state according to an embodiment of the present application.
Figure 8A:
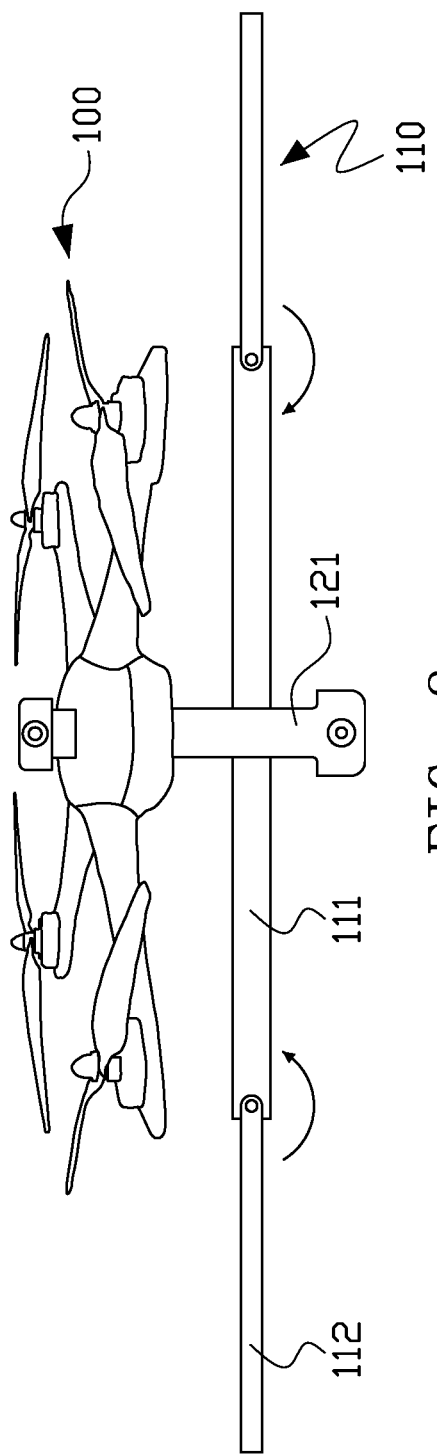
FIG. 8a is a schematic view of a UAV when the umbrella unit is in an opening state according to an example of the present application.
Figure 8B:
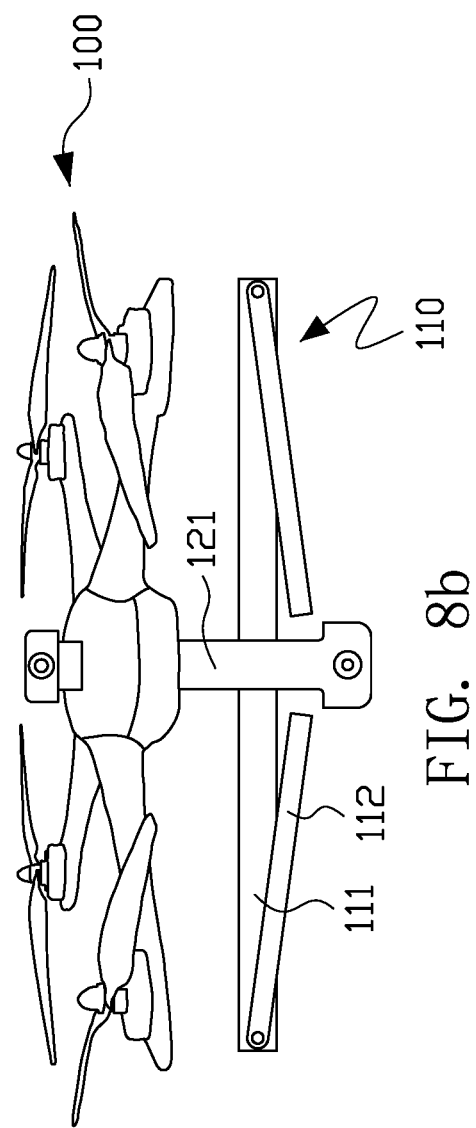
FIG. 8b is a schematic view of the UAV of FIG. 8a when the umbrella unit is in a closing state.
Figure 9A:
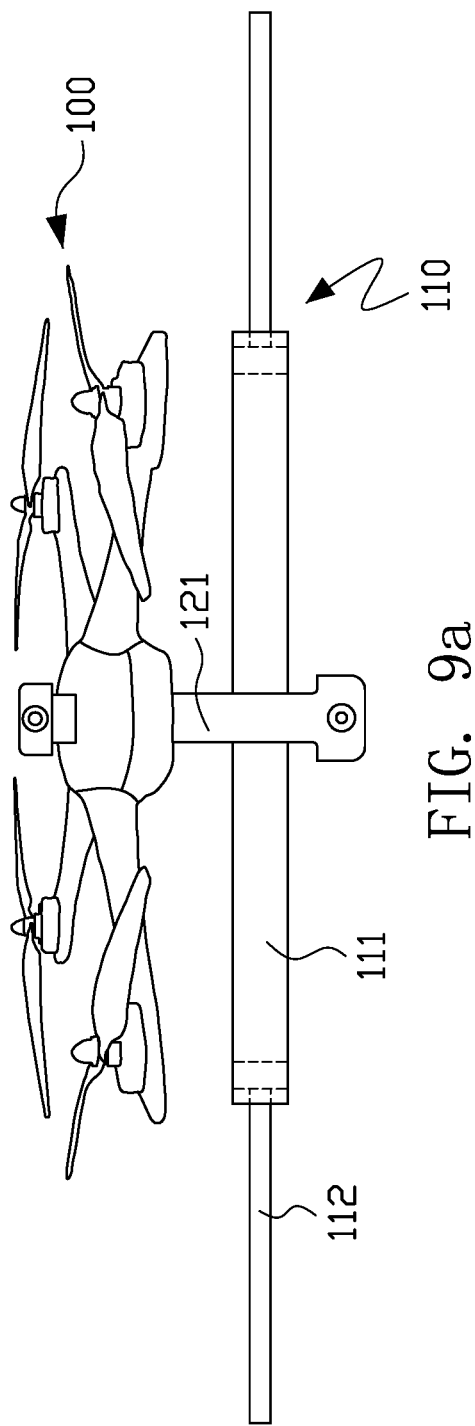
FIG. 9a is a schematic view of a UAV when the umbrella unit is in an opening state according to another example of the present application.
Figure 9B:
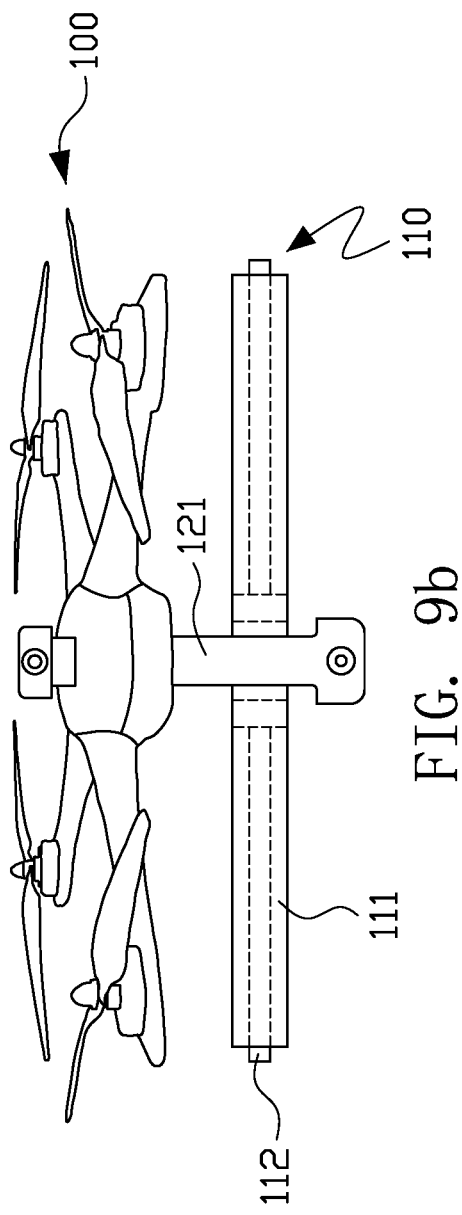
FIG. 9b is a schematic view of the UAV of FIG. 9a when the umbrella unit is in a closing state.

As shown in FIG. 7, the umbrella unit 110 may include a fixed umbrella disc 111 disposed in a central portion of the umbrella unit 110, a plurality of umbrella ribs 112 disposed around the fixed umbrella disc 111, and a plurality of umbrella wings 113. The plurality of umbrella ribs 112 extend along a radial direction of the umbrella unit 110. Each umbrella wing 113 is formed between every two adjacent umbrella ribs 112. The umbrella wings 113 can be made of fabric or plastic having ductility. In an embodiment, as shown in FIG. 8a and FIG. 8b, the umbrella unit 110 has a foldable structure, one end of each umbrella rib 112 near the fixed umbrella disc 111 is pivotably connected with the fixed umbrella disc 111. Under the driving of the second driving device 105, each umbrella rib 112 is pivoted relative to the fixed umbrella disc 111 and folded towards the fixed umbrella disc 111, so that the umbrella unit 110 is switched between an opening state and a closing state. In another embodiment, as shown in FIG. 9a and FIG. 9b, the umbrella unit 110 has a retractable structure, each umbrella rib 112 is retracted relative to the fixed umbrella disc 111 under the driving of the second driving device 105, so that the umbrella unit 110 is switched between an opening state and a closing state.

Figure 10:
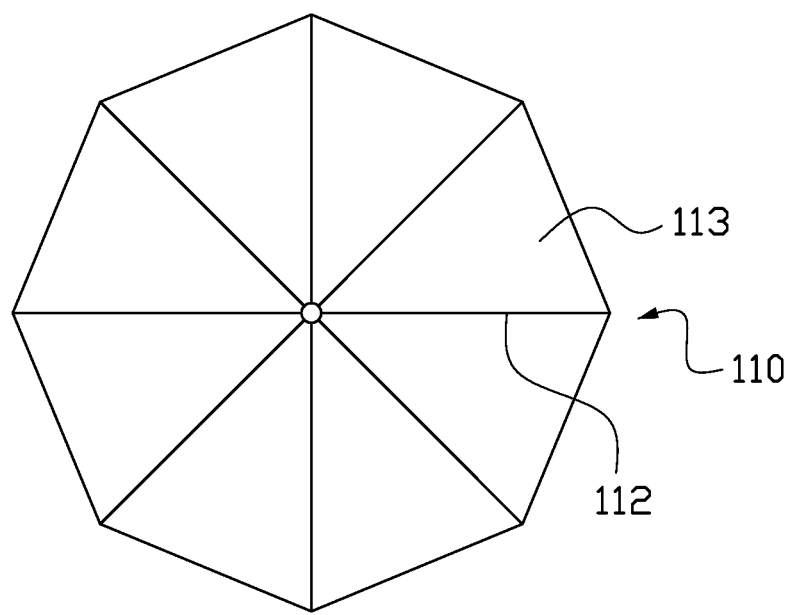
FIG. 10 is a schematic top view of an umbrella unit of a UAV in an opening state according to another embodiment of the present application.
Figure 11A:
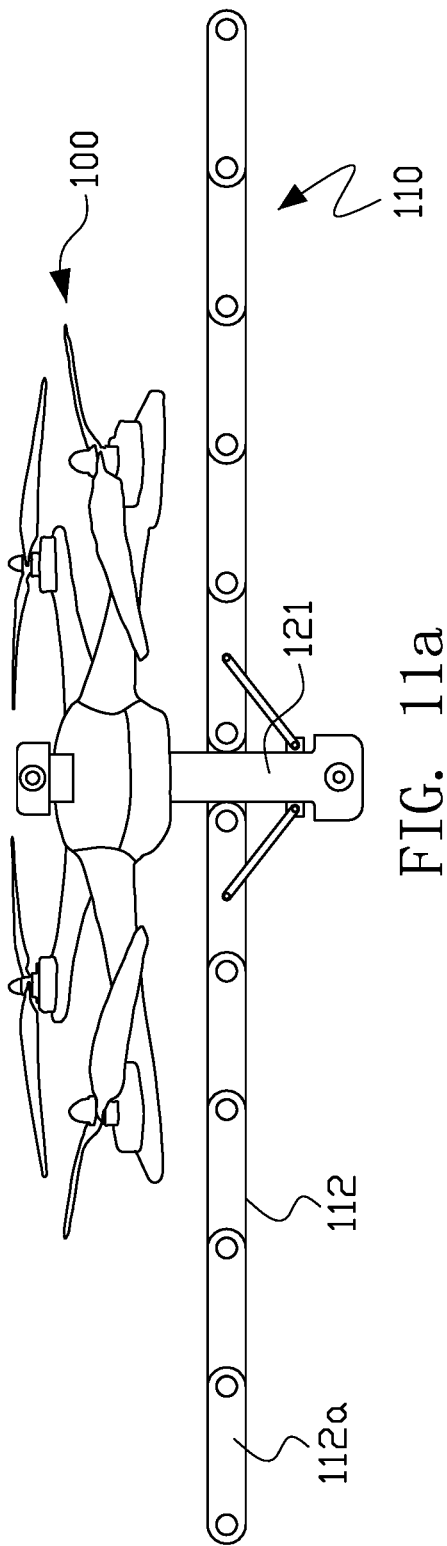
FIG. 11a is a schematic view of a UAV when the umbrella unit is in an opening state according to a further example of the present application.
Figure 11B:
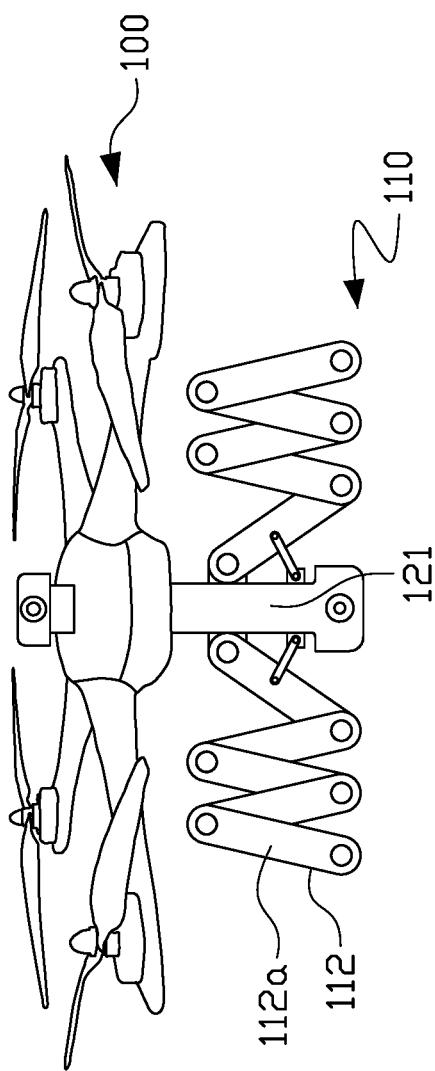
FIG. 11b is a schematic view of the UAV of FIG. 11a when the umbrella unit is in a closing state.

As shown in FIG. 10, the umbrella unit 110 may include a plurality of umbrella ribs 112 disposed around a circumferential direction of the umbrella unit 110 and a plurality of umbrella wings 113. The plurality of umbrella ribs 112 extend along a radial direction of the umbrella unit 110. Each umbrella wing 113 is formed between every two adjacent umbrella ribs 112. The umbrella wings 113 can be made of fabric or plastic having ductility. As shown in FIG. 11a and FIG. 11b, each umbrella rib 112 has multiple sections 112a pivoted together end-to-end. Under the driving of the second driving device 105, the multiple sections 112a of each umbrella rib 112 are unfolded to a straight line or folded together, so that the umbrella unit 110 is switched between an opening state and a closing state.

As shown in FIG. 2 and FIG. 3, the umbrella unit 110 may be disposed below the UAV body 101. In this way, the UAV 100 should have a high waterproof performance. The UAV 100 is required to use waterproof blushless motor with a waterproof grade of, for example, IP67.

Figure 12:
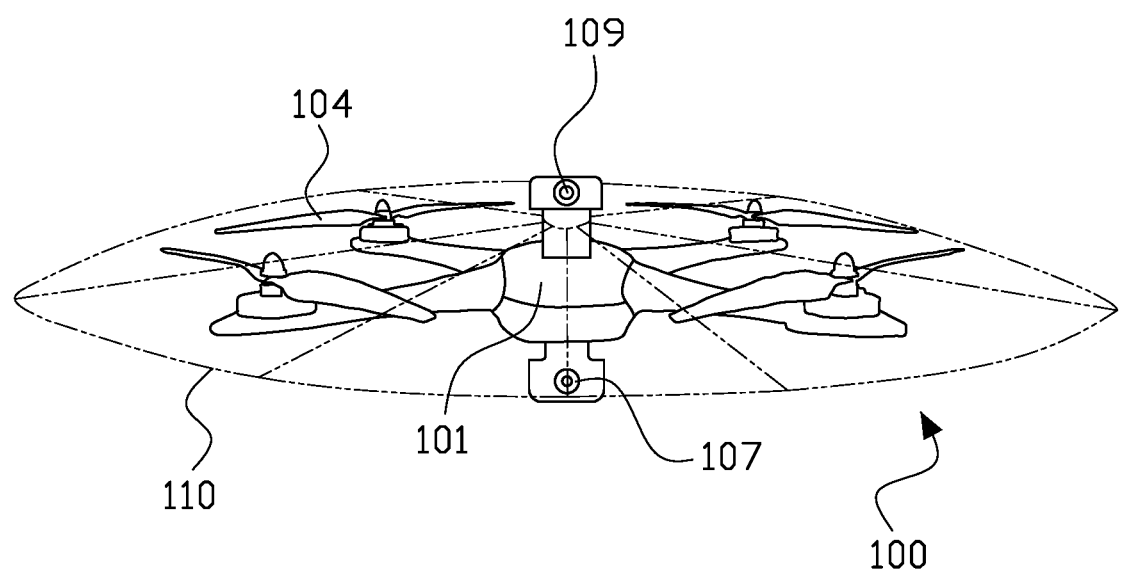
FIG. 12 is a schematic view of a UAV according to a further embodiment of the present application.

In another embodiment, as shown in FIG. 12, the umbrella unit 110 may be disposed above the UAV body 101. In this way, the umbrella unit 110 can be used to shelter the UAV body 101 from rain, and to some extent, the waterproof performance of the UAV 100 can be lowered.

There may be a connecting pole 121 provided above or below the UAV body 101 (referring to FIG. 8a and FIG. 8b, for example), and the umbrella unit 110 is connected to the connecting pole 121.

The first driving device 103, the second driving device 105 and the third driving device 203 may be selected from various existing driving devices. For example, the first driving device 103 may be driving motor. The second driving device 105 and the third driving device 203 may also be driving motor, or be comprised of driving motor with electric push rod, gear rack, lead screw nut, air cylinder, oil cylinder, connecting rod, hinge, spring, etc.

Figure 13:
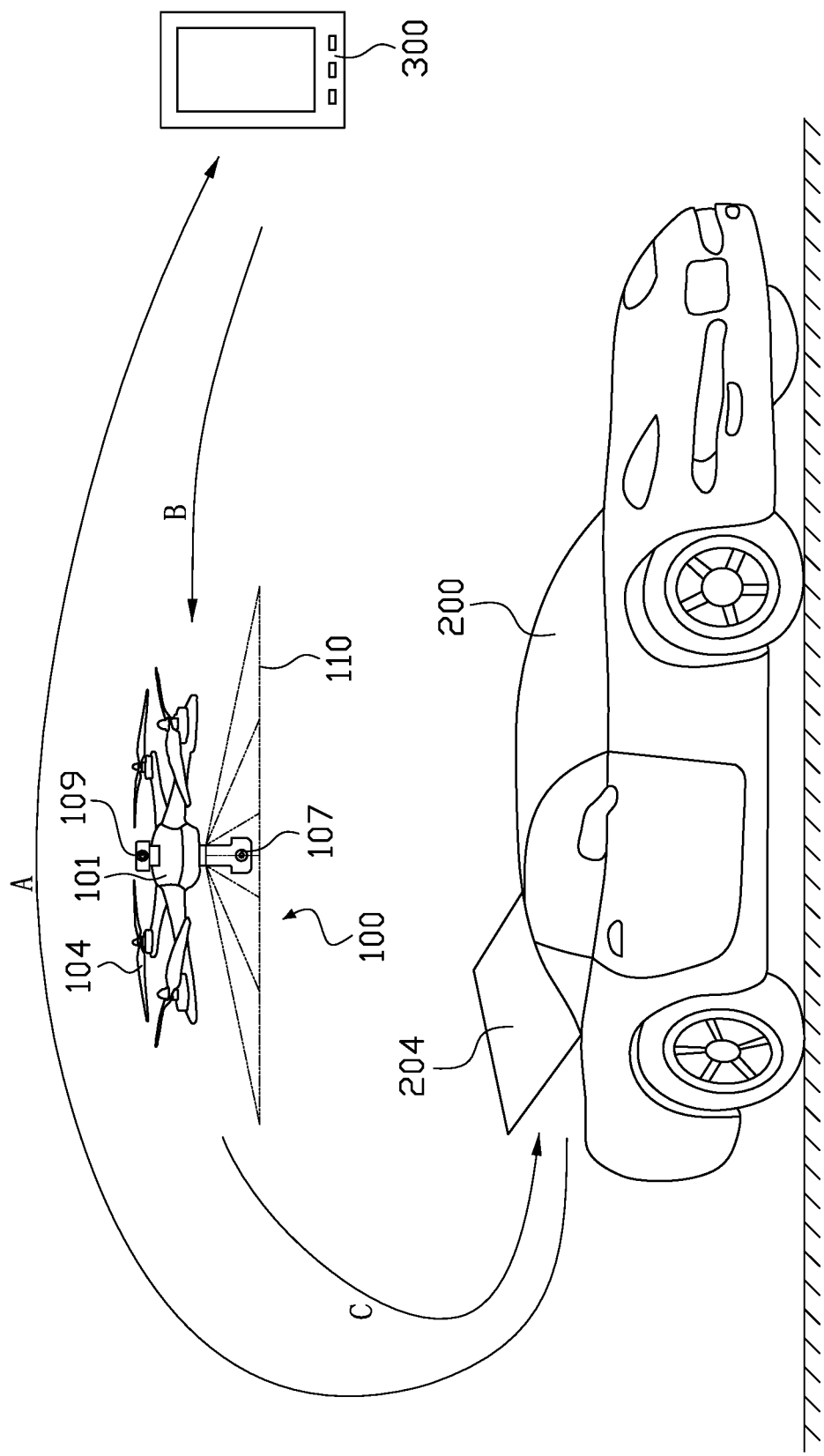
FIG. 13 is a schematic view showing that a UAV is used for holding umbrella for persons getting on a vehicle according to an embodiment of the present application.

As shown in FIG. 1 and FIG. 13, the UAV 100 can also be used for providing the holding umbrella service for the occupant getting on the vehicle 200. Specifically, the electronic terminal 300 further includes a third positioning module 305 and a call button 306. The third positioning module 305 is used for obtaining the current position of the electronic terminal 300. The position information of the electronic terminal 300 is sent to the UAV 100 through the third wireless communication module 302. The call button 306 is used for the occupant to input a call instruction for calling the UAV 100. The call instruction is sent to the vehicle 200 and the UAV 100 through the third wireless communication module 302. The vehicle controller 202 controls the third driving device 203 to drive the cabin door 204 to open according to the call instruction, the UAV controller 102 controls the first driving device 103 to drive the propeller 104 to bring the UAV body 101 to take off from the accommodating space 201 and fly above the occupant according to the call instruction and the position information of the electronic terminal 300.

When the UAV 100 is required to provide the holding umbrella service for the occupant getting on the vehicle 200, firstly, the occupant inputs a call instruction of calling the UAV 100 through the call button 306, and the electronic terminal 300 receives the call instruction of calling the UAV 100 inputted through the call button 306 by the occupant.

The electronic terminal 300 sends the call instruction to the vehicle 200 and the UAV 100, and the electronic terminal 300 sends the position information of the electronic terminal 300 to the UAV 100.

After the vehicle 200 receives the call instruction, the vehicle controller 202 controls the third driving device 203 to drive the cabin door 204 to open.

After the UAV 100 receives the call instruction, the UAV controller 102 controls the first driving device 103 to drive the propeller 104 to bring the UAV body 101 to take off from the accommodating space 201 and fly above the location where the occupant is located according to the position information of the electronic terminal 300 (as shown by route A). Specifically, because the current position of the electronic terminal 300 (i.e., the location of the occupant) obtained by the third positioning module 305 has been sent to the UAV 100 through the third wireless communication module 302, the UAV 100 can find the location of the occupant according to the position information of the electronic terminal 300.

After the UAV 100 flies to the location of the occupant, the UAV controller 102 controls the second driving device 105 to drive the umbrella unit 110 to be opened from a closing state to an opening state, so that the UAV 100 holds the umbrella unit 110 for the occupant.

When the occupant walks towards the vehicle 200, the UAV controller 102 controls the first driving device 103 to drive the UAV body 101 to fly and track the occupant automatically until the occupant gets on the vehicle 200 (as shown by route B).

After the occupant gets on the vehicle 200, the UAV controller 102 controls the second driving device 105 to drive the umbrella unit 110 to be closed from the opening state to the closing state.

The UAV controller 102 controls the first driving device 103 to drive the propeller 104 to bring the UAV body 101 to return back to the accommodating space 201 (as shown in route C).

The vehicle controller 202 controls the third driving device 203 to drive the cabin door 204 to close.

Preferably, as the UAV body 101 flies to automatically track the occupant, the potential obstacles surrounding the UAV body 101 are further detected, the UAV controller 102 controls the first driving device 103 to drive the UAV body 101 to keep away from the obstacles based on the detected result, in order to prevent the UAV body 101 or the umbrella unit 110 from colliding with the potential obstacles in the course of escorting the occupant by holding umbrella, thereby improving the security of flight.

The above are embodiments of the present application only, and should not be deemed as limitations to the present application. Although the present application has been disclosed in embodiments as above, it is not intended to limit the present application. It should be noted that variations and improvements will become apparent to those skilled in the art to which the present application pertains. Therefore, the scope of the present application is defined by the appended claims.

INDUSTRIAL APPLICABILITY

According to the embodiments, the present application provides an unmanned aerial vehicle (UAV) configured to be carried on a vehicle, and also provides a method and a system for holding umbrella using the UAV for persons getting on/off the vehicle. The UAV on the vehicle can be used to provide the holding umbrella service for persons getting on/off the vehicle. Since the occupant does not have to manually hold the umbrella, it is convenient for the occupant to get on/off the vehicle, thereby effectively solving the problem of getting wet when getting on/off the vehicle due to holding umbrella manually.

The invention claimed is:

1. A UAV (unmanned aerial vehicle) configured to be carried on a vehicle, comprising:
    a UAV body;
    a UAV controller;
    a first driving device connected with the UAV controller;
    a propeller connected with the first driving device;
    a second driving device connected with the UAV controller;
    an umbrella unit connected with the second driving device;
    a wireless communication module connected with the UAV controller and used for wirelessly communicating with the vehicle;
    wherein when the UAV provides holding umbrella service for an occupant, the UAV controller controls the first driving device to drive the propeller to bring the UAV body to take off from the vehicle and fly above a corresponding door of the vehicle or above the occupant, the UAV controller controls the second driving device to drive the umbrella unit to be opened from a closing state to an opening state, so that the UAV holds the umbrella unit for the occupant;
    wherein after the UAV finishes the holding umbrella service for the occupant, the UAV controller controls the second driving device to drive the umbrella unit to be closed from the opening state to the closing state, the UAV controller controls the first driving device to drive the propeller to bring the UAV body to return back to the vehicle.

2. The UAV of claim 1, wherein the UAV further comprises a tracking device connected with the UAV controller, the tracking device is used to track the occupant, the UAV controller controls the first driving device to drive the UAV body to fly and track the occupant automatically until his/her destination according to the tracking result of the tracking device.

3. The UAV of claim 2, wherein the UAV further comprises a positioning module connected with the UAV controller and used for obtaining the current position of the UAV, after the UAV finishes the holding umbrella service, the UAV controller controls the UAV body to return back to the vehicle according to the position information of the UAV and the position information of the vehicle.

4. The UAV of claim 2, wherein the tracking device is a camera.

5. The UAV of claim 2, wherein the UAV further comprises an obstacle avoidance device connected with the UAV controller and used for detecting the potential obstacles in a surrounding environment of the UAV body, the UAV controller controls the first driving device to drive the UAV body to keep away from the obstacles in flight according to the detected result of the obstacle avoidance device.

6. The UAV of claim 5, wherein the obstacle avoidance device is a camera or includes a plurality of ranging sensors.

7. The UAV of claim 1, wherein the umbrella unit includes a fixed umbrella disc disposed in a central portion of the umbrella unit, a plurality of umbrella ribs disposed around the fixed umbrella disc and a plurality of umbrella wings, the plurality of the umbrella ribs extends along a radial direction of the umbrella unit, each umbrella wing is formed between every two adjacent umbrella ribs.

8. The UAV of claim 7, wherein the umbrella unit has a foldable structure, one end of each umbrella rib near the fixed umbrella disc is pivotably connected with the fixed umbrella disc, each umbrella rib is pivoted relative to the fixed umbrella disc and folded towards the fixed umbrella disc under the driving of the second driving device.

9. The UAV of claim 7, wherein the umbrella unit has a retractable structure, each umbrella rib is retracted relative to the fixed umbrella disc under the driving of the second driving device.

10. The UAV of claim 1, wherein the umbrella unit includes a plurality of umbrella ribs disposed around a circumferential direction of the umbrella unit and a plurality of umbrella wings, the plurality of umbrella ribs extend along a radial direction of the umbrella unit, each umbrella wing is formed between every two adjacent umbrella ribs, each umbrella rib has multiple sections pivoted together end-to-end, the multiple sections of each umbrella rib are unfolded to a straight line or folded together under the driving of the second driving device.

11. A system for holding umbrella, comprising a vehicle and a UAV (unmanned aerial vehicle) carried on the vehicle, wherein:
    the UAV includes:
        a UAV body;
        a UAV controller;
        a first driving device connected with the UAV controller;
        a propeller connected with the first driving device;
        a second driving device connected with the UAV controller;
        an umbrella unit connected with the second driving device;
        a first wireless communication module connected with the UAV controller;
    the vehicle includes:
        an accommodating space for carrying the UAV;
        a vehicle controller;
        a third driving device connected with the vehicle controller;
        a cabin door connected with the third driving device, the cabin door provided above the accommodating space;
        a second wireless communication module connected with the vehicle controller, the UAV and the vehicle communicated with each other wirelessly via the first wireless communication module and the second wireless communication module;
    wherein when the UAV provides holding umbrella service for an occupant, the vehicle controller controls the third driving device to drive the cabin door to open, the UAV controller controls the first driving device to drive the propeller to bring the UAV body to take off from the accommodating space fly above a corresponding door of the vehicle or above the occupant, the UAV controller controls the second driving device to drive the umbrella unit to be opened from a closing state to an opening state, so that the UAV holds the umbrella unit for the occupant;
    wherein after the UAV finishes the holding umbrella service for the occupant, the UAV controller controls the second driving device to drive the umbrella unit to be closed from the opening state to the closing state, the UAV controller controls the first driving device to drive the propeller to bring the UAV body to return back to the accommodating space, the vehicle controller controls the third driving device to drive the cabin door to close.

12. The system of claim 11, wherein the vehicle further comprises a rain sensor connected with the vehicle controller, the rain sensor is used for detecting the raining information in the external environment, the vehicle controller determines whether the UAV is required to provide holding umbrella service or not according to the detecting result of the rain sensor.

13. The system of claim 11, wherein the vehicle further comprises a sunlight sensor and a temperature sensor both of which are connected with the vehicle controller, the sunlight sensor is used for detecting the sunlight information in the external environment, the temperature sensor is used for detecting the temperature information in the external environment, the vehicle controller determines whether the UAV is required to provide holding umbrella service or not according to the detecting results of the sunlight sensor and the temperature sensor.

14. The system of claim 11, wherein the vehicle further comprises a plurality of door switches connected with the vehicle controller, the vehicle controller is able to recognize the opening door which is currently being opened by the occupant according to on/off states of the door switches, the vehicle sends the information about the opening door which is currently being opened to the UAV via the second wireless communication module, the UAV flies above the opening door which is currently being opened according to the received information about the opening door.

15. The system of claim 11, wherein the vehicle further comprises a take-off button connected with the vehicle controller and used for the driver to manually input a take-off instruction indicating a specific door that needs the holding umbrella service, the vehicle sends the take-off instruction inputted by the take-off button to the UAV via the second wireless communication module, the UAV takes off from the vehicle according to the take-off instruction and flies above the indicated specific door.

16. The system of claim 11, wherein the vehicle further comprises a reminder device connected with the vehicle controller, when the UAV has flown above the door from which the occupant is going to get off, the UAV sends a reminding signal to the vehicle via the first wireless communication module, the vehicle controller controls the reminder device to remind the occupant to get off according to the received reminding signal.

17. The system of claim 11, wherein the UAV further comprises a tracking device connected with the UAV controller, the tracking device is used to track the occupant, the UAV controller controls the first driving device to drive the UAV body to fly and track the occupant automatically until his/her destination according to the tracking result of the tracking device.

18. The system of claim 17, wherein the UAV further comprises a first positioning module connected with the UAV controller and used for obtaining the current position of the UAV, the vehicle further comprises a second positioning module connected with the vehicle controller and used for obtaining the current position of the vehicle, the position information of the vehicle is sent to the UAV via the second wireless communication module, after the UAV finishes the holding umbrella service, the UAV controller controls the UAV body to return back to the accommodating space according to the position information of the UAV and the position information of the vehicle.

19. The system of claim 18, wherein the vehicle further comprises a display device, the position information of the UAV is sent to the vehicle via the first wireless communication module, the current position of the UAV is displayed on the display device of the vehicle.

20. The system of claim 18, wherein the system further comprises an electronic terminal, the electronic terminal includes a third wireless communication module, the electronic terminal and the UAV are communicated with each other wirelessly via the third wireless communication module and the first wireless communication module, the position information of the UAV is sent to the electronic terminal via the first wireless communication module, the current position of the UAV is displayed on a display panel of the electronic terminal.

21. The system of claim 20, wherein the electronic terminal further comprises a return button configured for inputting a return instruction to the UAV, the return instruction is sent to the UAV via the third wireless communication module, the UAV controller controls the UAV body to begin to return upon receiving the return instruction.

22. The system of claim 18, wherein the system further comprises an electronic terminal, the electronic terminal includes a third wireless communication module, a third positioning module and a call button, the electronic terminal and the UAV are communicated with each other wirelessly via the third wireless communication module and the first wireless communication module, the electronic terminal and the vehicle are communicated with each other wirelessly via the third wireless communication module and the second wireless communication module, the third positioning module is used for obtaining the current position of the electronic terminal, the position information of the electronic terminal is sent to the UAV via the third wireless communication module, the call button is used for the occupant to input a call instruction for calling the UAV, the call instruction is sent to the vehicle and the UAV via the third wireless communication module, the vehicle controller controls the third driving device to drive the cabin door to open according to the call instruction, the UAV controller controls the first driving device to drive the propeller to bring the UAV body to take off from the accommodating space and fly above the occupant according to the call instruction and the position information of the electronic terminal.

23. The system of claim 17, wherein the tracking device is camera.

24. The system of claim 23, wherein the camera is further used to recognize a specific gesture given by the occupant, the UAV controller determines according to the specific gesture that the occupant has reached his/her destination and begins to control the UAV body to return back.

25. The system of claim 17, wherein the UAV further comprises an obstacle avoidance device connected with the UAV controller and used for detecting the potential obstacles in a surrounding environment of the UAV body, the UAV controller controls the first driving device to drive the UAV body to keep away from the obstacles in flight according to the detected result of the obstacle avoidance device.

26. The system of claim 25, wherein the obstacle avoidance device is a camera or includes a plurality of ranging sensors.

27. A method for holding umbrella based on a system comprised of a vehicle and a UAV (unmanned aerial vehicle) carried on the vehicle, comprising:
 a vehicle controller controlling a third driving device to drive a cabin door to open;

a UAV controller controlling a first driving device to drive a propeller to bring a UAV body to take off from an accommodating space and fly above a door from which an occupant is going to get off the vehicle;

the UAV controller controlling a second driving device to drive an umbrella unit to be opened from a closing state to an opening state, so that the UAV holds the umbrella unit for the occupant;

after the occupant getting off the vehicle, the UAV controller controlling the first driving device to bring the UAV body to fly and track the occupant automatically until the occupant reaches his/her destination;

the UAV controller controlling the second driving device to drive the umbrella unit to be closed from the opening state to the closing state;

the UAV controller controlling the first driving device to drive the propeller to bring the UAV body to return back to the accommodating space; and the vehicle controller controlling the third driving device to drive the cabin door to close.

28. The method of claim 27, wherein the method further comprises:

detecting the potential obstacles in a surrounding environment of the UAV body as the UAV body flies to automatically track the occupant;

the UAV controller controlling the first driving device to bring the UAV body to keep away from the obstacles based on the detected result.

29. A method for holding umbrella based on a system comprised of an electronic terminal, a vehicle and a UAV (unmanned aerial vehicle) carried on the vehicle, comprising:

the electronic terminal receiving a call instruction of calling the UAV inputted by an occupant;

the electronic terminal sending the call instruction to the vehicle and the UAV, the electronic terminal sending the position information of the electronic terminal to the UAV;

a vehicle controller controlling a third driving device to drive a cabin door to open;

a UAV controller controlling a first driving device to drive a propeller to bring a UAV body to take off from an accommodating space and fly above the location where the occupant is located according to the position information of the electronic terminal;

the UAV controller controlling a second driving device to drive an umbrella unit to be opened from a closing state to an opening state, so that the UAV holds the umbrella unit for the occupant;

the UAV controller controlling the first driving device to bring the UAV body to fly and track the occupant automatically until the occupant gets on the vehicle;

after the occupant getting on the vehicle, the UAV controller controlling the second driving device to drive the umbrella unit to be closed from the opening state to the closing state;

the UAV controller controlling the first driving device to drive the propeller to bring the UAV body to return back to the accommodating space; and the vehicle controller controlling the third driving device to drive the cabin door to close.

30. The method of claim 29, wherein the method further comprises:

detecting the potential obstacles in a surrounding environment of the UAV body as the UAV body flies to automatically track the occupant;

the UAV controller controlling the first driving device to bring the UAV body to keep away from the obstacles based on the detected result.

* * * * *